(12) United States Patent
Tsuruta et al.

(10) Patent No.: US 7,090,480 B2
(45) Date of Patent: *Aug. 15, 2006

(54) METHOD AND APPARATUS FOR MOLDING CERAMIC SHEET

(75) Inventors: Tadashi Tsuruta, Aichi-pref. (JP); Satoru Yamaguchi, Anjyo (JP)

(73) Assignee: Denso Corporation (JP)

(*) Notice: Subject to any disclaimer, the term of this patent is extended or adjusted under 35 U.S.C. 154(b) by 0 days.

This patent is subject to a terminal disclaimer.

(21) Appl. No.: 10/934,403

(22) Filed: Sep. 7, 2004

(65) Prior Publication Data

US 2005/0025849 A1    Feb. 3, 2005

Related U.S. Application Data

(62) Division of application No. 09/892,518, filed on Jun. 28, 2001, now Pat. No. 6,802,996.

(30) Foreign Application Priority Data

Jun. 30, 2000 (JP) .............................. 2000-197996
May 9, 2001 (JP) .............................. 2001-139179

(51) Int. Cl.
*B29B 13/00* (2006.01)

(52) U.S. Cl. .................. 425/144; 425/378.1; 425/72.2; 425/379.1; 425/147; 425/197; 425/382.4

(58) Field of Classification Search ................ 425/144, 425/378.1, 72.2, 379.1, 197, 382.4; 264/40.1, 264/40.6, 638, 639, 177.11, 211.21, 211.23
See application file for complete search history.

(56) References Cited

U.S. PATENT DOCUMENTS

| | | | | | |
|---|---|---|---|---|---|
| 2,572,677 | A | * | 10/1951 | Tench ........................ | 425/461 |
| 3,904,551 | A | * | 9/1975 | Lundsager et al. ......... | 502/241 |
| 4,159,295 | A | | 6/1979 | Mazzuchelli et al. | |
| 4,262,737 | A | * | 4/1981 | Faillace ..................... | 165/267 |
| 4,364,881 | A | | 12/1982 | Mizuno et al. | |
| 4,839,120 | A | * | 6/1989 | Baba et al. ................. | 264/102 |
| 5,236,647 | A | * | 8/1993 | Lynch ........................ | 264/104 |
| 5,419,858 | A | * | 5/1995 | Hata et al. ................. | 264/40.5 |
| 6,432,341 | B1 | * | 8/2002 | Yamaguchi et al. ..... | 264/177.1 |
| 6,652,257 | B1 | * | 11/2003 | Yamaguchi et al. ........ | 425/144 |
| 6,790,025 | B1 | * | 9/2004 | Yamaguchi et al. ........ | 425/198 |
| 2003/0098530 | A1 | * | 5/2003 | Inoguchi .................... | 264/630 |

FOREIGN PATENT DOCUMENTS

| | | | |
|---|---|---|---|
| JP | | 53-21209 | 2/1978 |
| JP | | 61-125805 | 6/1986 |
| JP | | 61-270114 | 11/1986 |
| JP | | 63185850 A | * 8/1988 |
| JP | | 63-307903 | 12/1988 |
| JP | | 63307903 A | * 12/1988 |

(Continued)

*Primary Examiner*—Robert Davis
*Assistant Examiner*—G. Nagesh Rao
(74) *Attorney, Agent, or Firm*—Nixon & Vanderhye PC

(57) ABSTRACT

A method and an apparatus capable of extrusion molding a comparatively wide, thin ceramic sheet using a screw extruder while suppressing the wrinkling thereof. The molding apparatus includes a screw-type extruder and a mold at the forward end of the extruder is used to extrusion mold a ceramic sheet from the ceramic material introduced into the extruder by way of the mold. The extrusion molding is carried out while regulating the temperature of the portion of the ceramic material passing through the mold corresponding to each of a plurality of areas (control zones) into which the mold is divided.

9 Claims, 10 Drawing Sheets

FOREIGN PATENT DOCUMENTS

| | | |
|---|---|---|
| JP | 5-24025 | 2/1993 |
| JP | 6-134731 | 5/1994 |
| JP | 9-328366 | 12/1997 |
| JP | 10-152379 | 6/1998 |

\* cited by examiner

METHOD AND APPARATUS FOR MOLDING CERAMIC SHEET

This application is a division of application Ser. No. 09/892,518, filed Jun. 28, 2001, U.S. Pat. No. 6,802,996 the entire contents of which is hereby incorporated by reference in this application.

BACKGROUND OF THE INVENTION

1. Field of the Invention

The present invention relates to a method and an apparatus for molding a ceramic sheet used, for example, for a laminated exhaust gas sensor and a laminated heater.

2. Description of the Related Art

The doctor blade method (casting method) and the extrusion molding method are known for molding a ceramic sheet.

Generally, a ceramic sheet is molded by the doctor blade method. In this method, ceramic powder is mixed with an organic binder, a solvent, etc. to produce a slurry. The slurry is injected into a dam having a doctor blade arranged on a carrier film, and the carrier film is moved at a predetermined speed in a predetermined direction. As a result, the slurry flows out continuously from the gap between the doctor blade and the carrier film. After that, the slurry is dried together with the carrier film and separated from the carrier film thereby to produce a ceramic sheet of a predetermined thickness.

The doctor blade method, however, requires the use of a slurry with a large amount of solvent added thereto, and therefore a large number of pores are formed in the dried sheet after volatilization of the solvent. The presence of a large number of pores causes such inconveniences as a reduction in the ceramic powder filling factor, an increased burning shrinkage and variations of the burning shrinkage. This poses the problem of variations of the product size.

It is very difficult to maintain the thickness of a slurry. Therefore, a thick sheet cannot be molded from a slurry. When manufacturing a product using a thick sheet, therefore, the problem is posed that an appropriate number of thin sheets are required to be stacked.

Also, it is very difficult to acquire monodisperse ceramic powder having a uniform grain size distribution. Therefore, the grain size distribution of the ceramic powder has a certain margin. Even if a thick sheet could be molded by the doctor blade method, ceramics of larger grains naturally sediment faster in the slurry in the drying process. Thus, a density difference occurs between the upper surface portion and the lower surface portion of the sheet. As a result, a difference of the burning shrinkage occurs between the upper and lower surfaces, thereby posing the problem of a warped product. This problem may be caused also with a thin sheet processed by the doctor blade method.

In the extrusion molding method, on the other hand, the filling factor of ceramic powder is so high that a thick sheet can be molded.

The extrusion molding is of two types, plunger and screw (auger). The extrusion molding of a plunger type is a method in which a ceramic material is filled in a mold and extruded from the mold by piston, and can produce a predetermined fluidity depending on the manner in which the ceramic material is filled. Nevertheless, the disadvantage of this method is that the ceramic material cannot be extruded continuously.

The extrusion molding of screw type, on the other hand, is a method in which the ceramic material is continuously extruded from a mold by rotating a screw. Due to the variations of fluidity of the ceramic material in the screw extruder, however, an attempt to mold a wide, thin sheet using an extruder having a screw of a small diameter would partially increase or decrease the molding pressure, resulting in an irregular flow of the ceramic material which in turn leads to wrinkles in the sheet.

Various solutions to this problem have been proposed as described below.

(1) The pressure exerted on the ceramic material is sufficiently equalized by increasing the screw diameter. This solution can prevent the generation of wrinkles on the sheet but leads to a very bulky screw extruder. As a result, when changing the ceramic material, the disassembly and cleaning process requires a great number of steps. Also, since a greater amount of ceramic materials are left in the apparatus, the yield of the material is considerably deteriorated.

(2) Japanese Unexamined Patent Publication No. 63-307903 discloses a technique for the plunger type, in which the flow rate of the sheet is substantially equalized at the ends and the central portion of the sheet by setting the temperature higher at the ends than at the central portion of the sheet. For the screw type of extrusion molding, however, unlike the plunger version, the flow rate at the central portion is not always high, and therefore the flow rate adjustment is impossible in the case where the flow rate at the ends or a given portion is higher. Therefore, this technique is not directly applicable to the screw type of extrusion molding. Even if applicable, many defects would be caused in the sheet in the case where the screw diameter is large.

(3) Japanese Unexamined Patent Publication No. 61-125805 proposes a technique for regulating the flow rate by extending or retracting a rectification block. However, this is intended for applications to thick, wide sheets and fails to achieve the object of the present invention.

(4) Japanese Unexamined Patent Publications No. 9-328366 and No. 10-152379 propose a technique in which the fluidity of the ceramic material (body) can be improved by changing the plasticizer or the like added to the body to produce a uniform sheet. This method, however, poses the problem that a change in the composition of the additive changes the various ceramic characteristics including the burning shrinkage resulting in different product performance.

In spite of the various techniques thus far proposed as solutions to prevent the wrinkling of a ceramic sheet as described above, an effective solution for the screw extruder has yet to be discovered. Especially, a method has not yet been established for the extrusion molding of a wide, thin ceramic sheet in the screw extruder which can suppress wrinkling.

SUMMARY OF THE INVENTION

The present invention has been developed in view of the problem points of the prior art described above, and the object thereof is to provide a method and an apparatus for molding a ceramic sheet, in which a comparatively wide, thin ceramic sheet can be extrusion molded while suppressing the wrinkling using a screw extruder of a small diameter.

According to a first aspect of the invention, there is provided a method of molding a ceramic sheet using a molding apparatus having an extruder of screw type and a mold arranged at the forward end portion of the extruder, wherein the ceramic material introduced into the extruder is molded into a sheet by extrusion from the mold, and wherein the ceramic material passing through the mold is divided into a plurality of transverse areas, for each of which the temperature is regulated in the process of extrusion molding.

What is most noticeable about this aspect of the invention is that the ceramic material passing through the mold is extrusion molded while regulating the temperature of each of a plurality of transverse areas into which the mold is divided.

The mold is preferably divided into three or more transverse areas. As a result, at least the central portion can be temperature-regulated separately from the side portions. A specific number of areas into which the mold is to be divided can be appropriately selected in accordance with the width, etc. of the ceramic sheet to be molded.

The functions and effects of this aspect of the invention will be explained below.

In this aspect of the invention, the ceramic material being passed through a mold is extrusion molded while regulating the temperature of a plurality of transverse areas into which the mold is divided. As a result, the transverse difference of the molding rate and the resulting geometrical deformation of the ceramic sheet can be accurately suppressed.

In the case where the central area of the ceramic material passing through the mold is corrugated (wrinkled) due to a higher molding rate, for example, the temperature of the central area is kept relatively low. Specifically, the temperature of the central area is reduced and/or the temperature of the other areas is increased.

In this way, the temperature of the area corresponding to the transverse central portion of the ceramic material passing through the mold is relatively decreased and so is the fluidity thereof. This phenomenon occurs due to the correlation between the fluidity and the temperature of the ceramic material. The relative decrease of fluidity in the central area of the ceramic material leads to the relative decrease of the extrusion molding rate in the particular area. As a result, the ceramic sheet is extruded out of the mold at a substantially uniform extrusion molding rate in transverse direction, thereby improving the shape of the ceramic sheet free of wrinkles.

Even in the case where a wrinkle is not generated in the central area but in other portions, the relative decrease of the temperature of the ceramic material passing through the mold in the area corresponding to the particular portions can cause the relative decrease of the fluidity and the relative decrease of the extrusion molding rate at the particular area. As a result, the extrusion molding of the ceramic sheet extruded from the mold is corrected to a transversely uniform rate, with a shape improved to be free of wrinkles.

According to this aspect of the invention, the shape can be positively corrected as described above. Even a comparatively wide, thin ceramic sheet which has conventionally failed to be successfully extrusion molded and wrinkled in the screw extruder can be molded smoothly to a very excellent shape.

Thus, according to this aspect of the invention, there is provided a method of molding a ceramic sheet, in which even a comparatively wide, thin ceramic sheet can be extrusion molded while suppressing the wrinkling in a screw extruder.

According to a second aspect of the invention, there is provided a method for molding a ceramic sheet, in which the correlation data on the molding rate of ceramic sheet to be extrusion molded is obtained by measurement for the portion corresponding to each area, and the temperature is preferably regulated based on the correlation data on the molding rate thus obtained. In this way, the temperature can be regulated automatically even in the case where the condition of the ceramic material extruded into the mold from the extruder is liable to change, thereby making it possible to control the shape of the ceramic sheet more accurately. The correlation data on the molding rate for each area described above may be the molding rate data obtained by a non-contact speed sensor or may be the geometrical data or the displacement data correlated with the molding rate. This is by reason of the fact that the difference in molding rate is reflected in the sheet shape by wrinkles and corrugations. Therefore, the measurement of the shape and displacement can replace the molding rate data.

According to a third aspect of the invention, there is provided a method for molding a ceramic sheet, wherein the outer diameter d of the screw built in the extruder and the width W of the ceramic sheet preferably hold the relation $W \geq 3d$. Specifically, a thin ceramic sheet having a width W more than 3d is liable to wrinkle. According to this aspect of the invention, the superior functions and effects described above are exhibited and the wrinkling or the like can be prevented.

According to a fourth aspect of the invention, there is provided a method for molding a ceramic sheet, wherein the outer diameter d of the screw built in the extruder and the width W of the ceramic sheet may hold the relation $W \geq 5d$. Although wrinkles are more easily developed in this case, the superior functions and effects described above can be exhibited positively and thus the wrinkling can be prevented.

According to a fifth aspect of the invention, there is provided a method for molding a ceramic sheet, wherein the outer diameter d of the screw built in the extruder is preferably not more than 70 mm. In this case, the whole screw extruder can be built in compact form, and the disassembly work for replacing parts or materials can be performed by a single worker. Thus, the molding process can be simplified and the number of molding steps can be reduced. On the other hand, the smaller the outer diameter of the screw of the screw extruder, the more difficult it is to produce a wide ceramic sheet. According to this invention, however, the functions and effects described above can be exhibited, and therefore even a wide ceramic sheet which has conventionally been difficult to produce can be molded in a superior shape.

Also, by reducing the screw diameter to 70 mm or less, the internal volume of the screw extruder can also be reduced. As a result, the amount of air introduced into the screw extruder can be reduced, so that air is prevented from mixing with the ceramic sheet produced for an improved product quality. The prevention of air from mixing in the ceramic sheet can also suppress the internal defects of the ceramic sheet. Further, an insulation failure or cracking can be prevented in electrical applications of the ceramic sheet as an electrical insulating material.

According to a sixth aspect of the invention, there is provided a method for molding a ceramic sheet, wherein the thickness of the ceramic sheet is preferably not more than 1.5 mm. The width of the ceramic sheet having a thickness not more than 1.5 mm cannot conventionally be increased as wrinkles would otherwise develop. According to this aspect of the invention, on the other hand, the functions and effects can be exhibited considerably even with the thickness of not more than 1.5 mm, and even a wide ceramic sheet which has conventionally been difficult to produce can be molded in a superior shape.

According to a seventh aspect of the invention, there is provided a method for molding a ceramic sheet, wherein the thickness of the ceramic sheet may not be more than 300 μm.

In this case, wrinkles are more liable to develop. Nevertheless, the molding in an excellent shape is made possible by the superior functions and effects exhibited as described above.

According to an eighth aspect of the invention, there is provided a method for molding a ceramic sheet, wherein the mold includes a plurality of retractable rectification plates arranged to change the flow resistance. The extrusion molding can thus be carried out while adjusting the flow resistance of the ceramic material by extending/retracting the rectification plate while at the same time regulating the temperature. In this case, wrinkles or the like irregular shapes can be corrected more effectively by controlling the physical flow resistance by extension/retraction of the rectification plates in addition to the temperature regulation for each area.

According to a ninth aspect of the invention, there is provided an apparatus for molding a ceramic sheet, comprising a screw type of extruder and a mold arranged at the forward end of the extruder for extrusion molding a ceramic material introduced into the extruder to form a ceramic sheet, wherein the mold includes means for regulating the temperature of the portion of the ceramic sheet corresponding to each one of the transverse areas into which the mold is divided.

What is most noticeable about this aspect of the invention is that the temperature regulation means for regulating the temperature of the ceramic material is arranged in each of the areas.

The temperature regulation means can employ any of various methods as described later. The mold is preferably divided into at least three transverse areas to make it possible to control at least the central portion and the end portions.

Also, the temperature regulation means can be arranged on one or both of the upper and lower dies of the mold. In the case where the temperature regulation means is arranged on both the upper and lower dies, the mold can be divided transversely in the same number or different numbers of areas for both the upper and lower dies.

Now, the functions and effects of the molding apparatus according to this aspect of the invention will be explained.

The mold of the molding apparatus according to this aspect of the invention has the temperature regulation means as described above. In the case where a ceramic sheet is extrusion molded using this molding apparatus, therefore, the ceramic material passing through the mold can be extrusion molded while regulating the temperature thereof by the temperature regulation means for each of a plurality of portions of the ceramic sheet corresponding to the transverse areas into which the mold is divided. As a result, a very excellent molding method can be positively implemented.

In this aspect of the invention, there is provided a ceramic sheet molding apparatus in which a comparatively wide, thin ceramic sheet can thus be extrusion molded by the screw extruder while suppressing the wrinkling.

According to a tenth aspect of the invention, there is provided an apparatus for molding a ceramic sheet, wherein the temperature regulation means preferably includes a chamber associated with each of the areas into which the mold is transversely divided, and a heating medium circulation means included in each chamber for circulating a heating medium to heat or cool the material. In this case, the temperature of the ceramic material in each area can be easily regulated by controlling the flow rate or the temperature of the heating medium circulated in each chamber.

According to an 11th aspect of the invention, there is provided an apparatus for molding a ceramic sheet, wherein the temperature regulation means can include a heater controllable for each of the areas into which the mold is divided transversely. In this case, the temperature of the ceramic material in the respective areas can be increased separately from each other by differentiating the heating capacity of each heater. Also, the heater can be used with the heating medium circulated in the chamber, in which case the temperature can be regulated easily by any combination of various heating or cooling factors, thereby improving the temperature control accuracy.

According to a 12th aspect of the invention, there is provided an apparatus for molding a ceramic sheet, preferably comprising a molding rate correlation data measuring means for measuring, for each corresponding area, the molding rate of the ceramic sheet extruded from the mold, and control means for controlling the temperature regulation means based on the molding rate correlation data acquired from the molding rate correlation data measuring means. In this case, the temperature regulation means can be controlled accurately in accordance with the molding rate distribution fed back from the molding rate correlation data measuring means.

The molding rate correlation data measuring means is not confined to a speed sensor for measuring the molding rate directly, but may be an indirect measuring means such as a shape sensor, a displacement sensor, etc. which is controlled to measure the shape or displacement correlated with the molding rate.

According to a 13th aspect of the invention, there is provided an apparatus for molding a ceramic sheet, wherein the outer diameter d of the screw built in the extruder and the width W of the ceramic sheet preferably hold the relation $W \geq 3d$. In this case, as in the cases described above, the effect of preventing the wrinkling can be exhibited especially conspicuously.

According to a 14th aspect of the invention, there is provided an apparatus for molding a ceramic sheet, wherein the outer diameter d of the screw built in the extruder and the width W of the ceramic sheet may alternatively hold the relation $W \geq 5d$. In this case, too, as in the cases described above, the effect of preventing the wrinkling can be exhibited conspicuously.

According to a 15th aspect of the invention, there is provided an apparatus for molding a ceramic sheet, wherein the outer diameter d of the screw built in the extruder is preferably not more than 70 mm. In this case, as in the cases described above, the whole screw extruder can be reduced in size to a comparatively compact form, and the disassembly work including the job of replacing the materials can be carried out by a single worker. Thus, the process can be rationalized and the number of the production steps can be reduced, while at the same time effectively preventing wrinkling, etc. Also, as described above, the intrusion of air into the ceramic sheet produced can be suppressed.

According to a 16th aspect of the invention, there is provided an apparatus for molding a ceramic sheet, wherein the thickness of the ceramic sheet is preferably not more than 1.5 mm. In producing a ceramic sheet having a thickness of not more than 1.5 mm, the width thereof cannot be increased sufficiently as wrinkles would otherwise be caused. In spite of this, the functions and effects described above can be exhibited conspicuously in this range according to this invention.

According to a 17th aspect of the invention, there is provided an apparatus for molding a ceramic sheet, wherein the thickness of the ceramic sheet is preferably not more than 300 µm. In this case, as described above, the ceramic sheet is more liable to wrinkle. Nevertheless, the aforementioned functions and effects makes it possible to mold the ceramic material in an excellent shape.

According to an 18th aspect of the invention, there is provided an apparatus for molding a ceramic sheet, wherein the mold preferably includes a plurality of rectification plates arranged in retractable manner for changing the flow resistance of the ceramic material. In this case, the shape of the ceramic sheet can be corrected even more effectively by controlling both the temperature regulation means and the rectification plates.

DESCRIPTION OF THE PREFERRED EMBODIMENTS

First Embodiment

A method and an apparatus for molding a ceramic sheet according to an embodiment of the invention will be explained with reference to FIGS. 1 to FIGS. 5(a) to 5(c).

Figure 1:
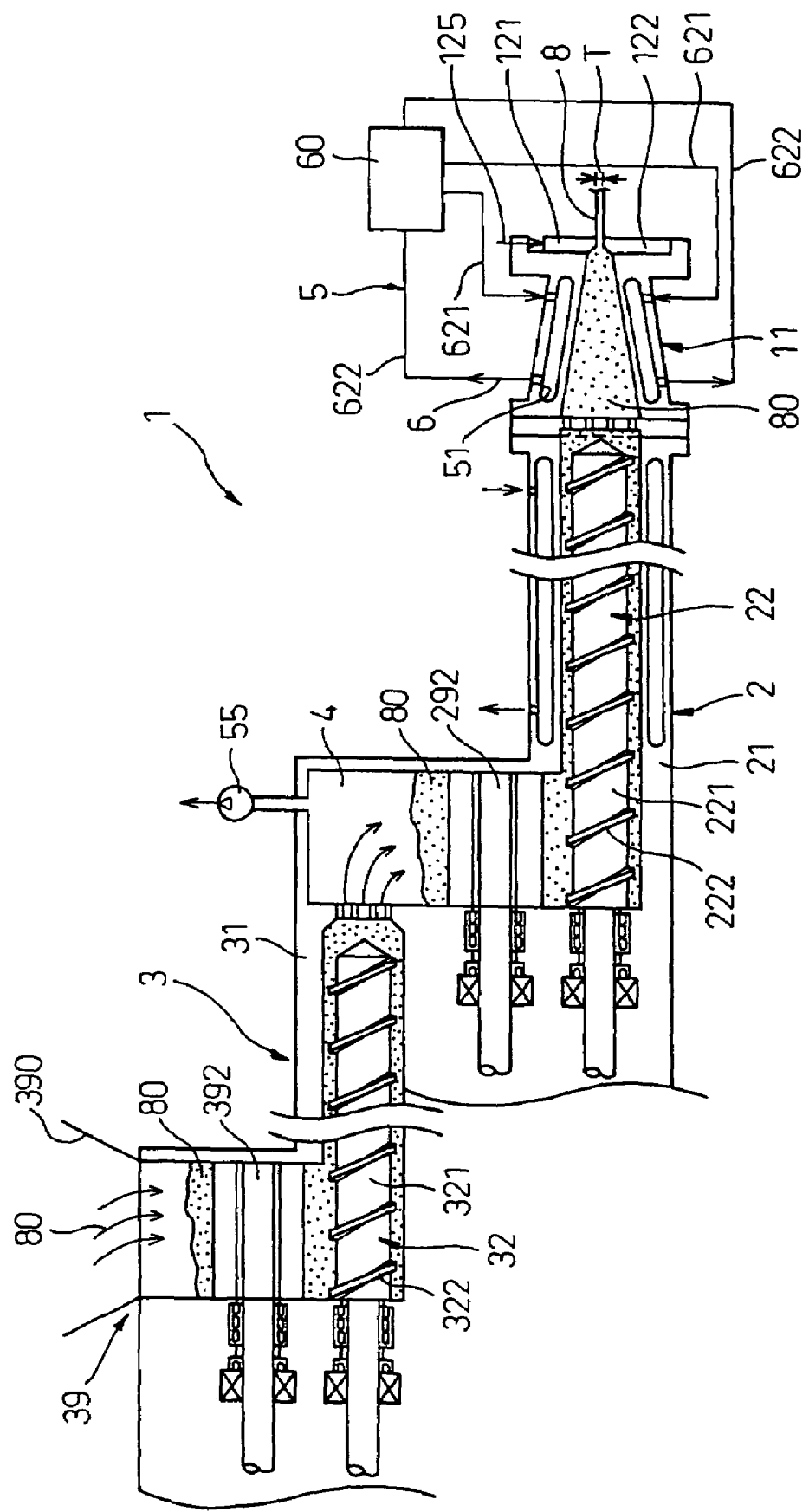
FIG. 1 is a diagram for explaining the configuration of a molding apparatus according to a first embodiment of the invention.

A ceramic sheet molding apparatus 1 according to this embodiment, as shown in FIG. 1, comprises screw-type extruders 2, 3 and a mold 11 arranged at the forward end of the extruder 2, wherein a ceramic material 80 introduced into the extruder 2 is extrusion molded into a ceramic sheet 8 by way of the mold 11.

The mold 11 includes temperature regulation means 5 for regulating the temperature of the ceramic material 80 passing through the mold 11 in each of a plurality of areas into which the mold 11 is transversely divided.

A detailed explanation will be given below.

The molding apparatus 1 according to this embodiment, as shown in FIG. 1, comprises the screw-type extruders 2, 3 in two stages and the mold 11 arranged at the forward end of the low-stage extruder 2.

Figure 2:
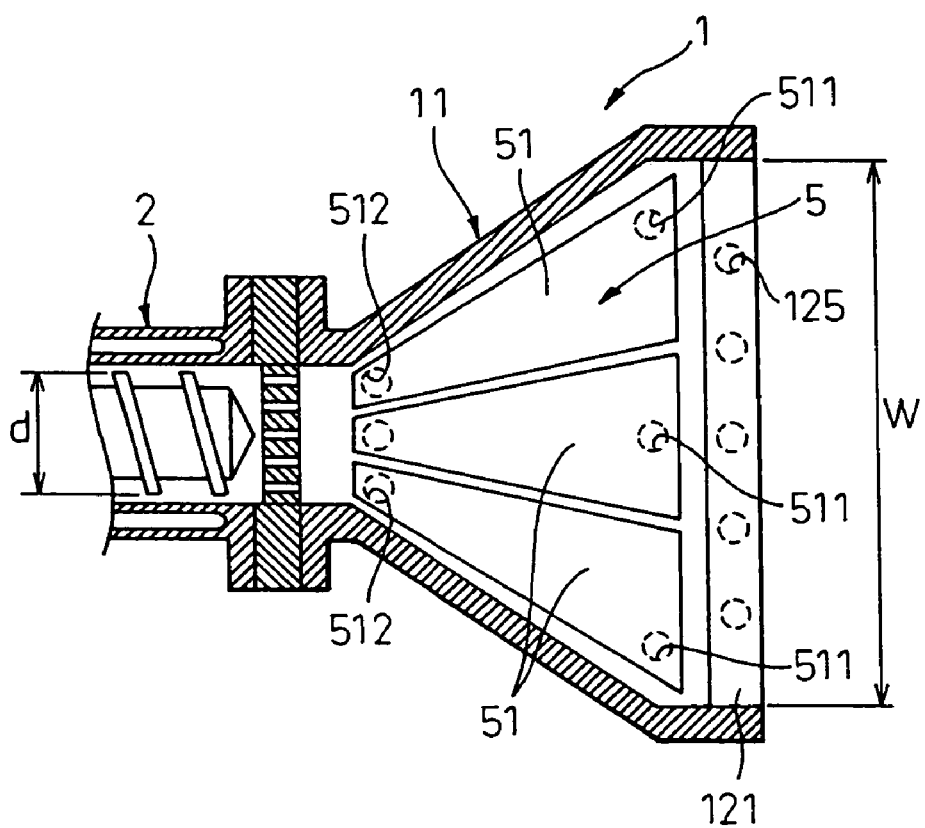
FIG. 2 is a diagram for explaining the configuration of the upper portion of the cross section of a mold according to the first embodiment of the invention.

The mold 11, as shown in FIGS. 1 and 2, shaped like a circular pipe having one side thereof crushed, has a progressively smaller height and a progressively larger width toward the forward end thereof. As shown in FIG. 1, the mold 11 has, at the forward end thereof, a pair of bases 121, 122 for limiting the thickness of the ceramic sheet 8 extrusion molded. The upper base 121 is arranged to be retractable by changing the amount by which an adjust screw 125 is forced in, and thus the gap between it and the lower base 122 can be adjusted.

Figure 3:
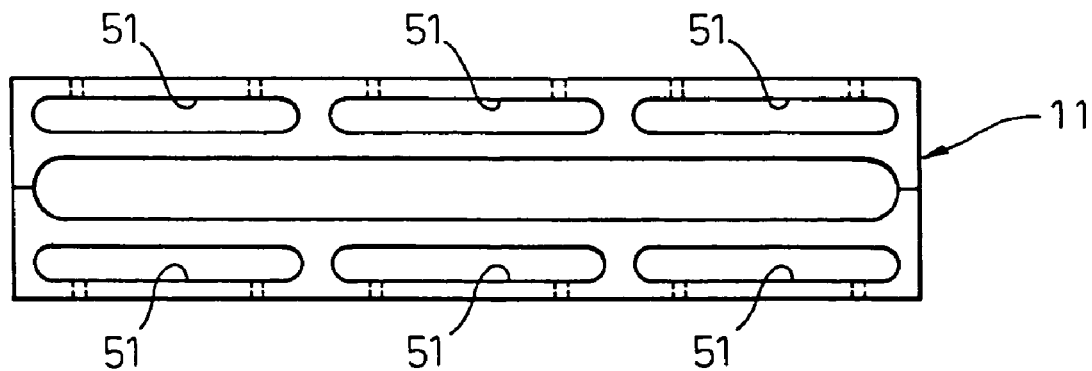
FIG. 3 is a diagram for explaining the configuration of the longitudinal section of the mold orthogonal to the direction of extrusion according to the first embodiment of the invention.
Figure 4:
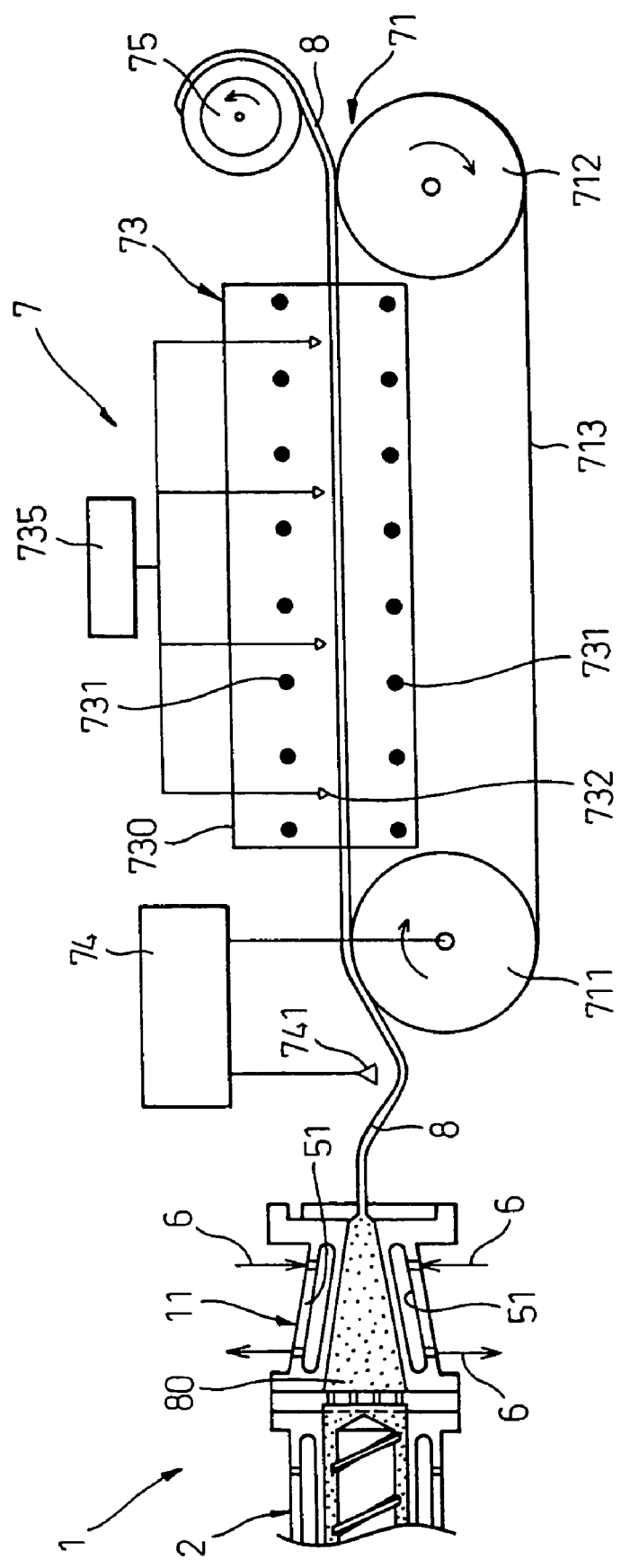
FIG. 4 is a diagram for explaining the configuration of a dryer according to the first embodiment of the invention.

The temperature regulation means 5 of the mold 11, as shown in FIGS. 1 to 3, includes chambers 51 arranged for the respective areas into which the mold 11 is transversely divided, and heating medium circulation means 60 for circulating a heating medium 6 in the chambers 51 to cool the material.

The chambers 51 according to this embodiment, as shown in FIGS. 2, 3, are formed in the three upper and lower areas into which the mold is transversely divided. Each chamber includes an inlet 511 and an outlet 512 of the heating medium, to which the circulation pipes 621, 622 of the heating medium circulation means 60 are connected, respectively.

The heating medium circulation means 60 is so configured that the heating medium 6 can be circulated in each chamber 51 from a heating medium tank through a pump, a solenoid valve, etc. The heating medium circulation means 60 can be controlled by any of various methods and can be configured in any of various ways. As in an embodiment described later, for example, the automatic control by feed back can be employed. In the present embodiment, however, the automatic control is not employed, but the temperature and the flow rate of the heating medium 6 supplied to each chamber 51 for cooling the material are regulated manually.

Also, as shown in FIG. 1, the screw-type extruders 2, 3 are configured of extrusion screws 22, 23 including shaft members 221, 321 and lead portions 222, 322 spirally wound around the shaft members 221, 321, respectively. The extrusion screws 22, 23 are built in housings 21, 31, respectively. The extrusion screws 22, 23 according to this embodiment have an outer diameter (the outer diameter of the lead portion) d of $\phi$30 mm. A vacuum chamber 4 is arranged between the two extrusion screws 22, 23. Also, a material supply portion 39 for introducing the ceramic material 80 is arranged at the upper rear portion of the upper extruder 3.

The material supply portion 39, as shown in FIG. 1, has an opening 390 in the shape of inverted parallelepiped and a pair of push-in rollers 392 arranged at the lower left and right sides. The push-in rollers 392 are so configured as to bite into the ceramic material 80 loaded between the push-in rollers 392 and send it into the lower extruder 3.

The vacuum chamber 4 is so configured that the interior thereof can be evacuated by a pump 55 to degas the ceramic material 80 extruded from the upper extruder 3. Further, a pair of push-in rollers 292 similar to those for the material supply portion 39 are arranged in the vacuum chamber 4.

This embodiment further comprises a dryer 7 by which a ceramic sheet 8 molded by a molding apparatus 1 is dried and wound up in a coil. The dryer 7 includes a belt conveyor 71 having a pair of pulleys 711, 712 and a belt 713 driven by the pulleys 711, 712. The belt conveyer 71 has also arranged thereon a heater chamber 73 through which the belt 713 passes. The heater chamber 73 includes a case 730 for encasing a heater 731 and a temperature sensor 732. A heater controller 735 controls the heater 731 based on the measurement of the temperature sensor 732 thereby to maintain a predetermined temperature.

The belt conveyer 71 includes, on the entrance side thereof, a displacement sensor 741 for measuring the amount of displacement of the ceramic sheet 8 extrusion molded, and a speed control unit 74 for controlling the speed of the belt conveyer to assure a predetermined amount of displacement based on the measurement of the displacement sensor 741.

The belt conveyer 71 includes, on the exit side thereof, a coiler 75 for spirally winding up the dried ceramic sheet 8.

A ceramic sheet 8 was actually molded using the molding apparatus 1.

A mixture of 100 parts of alumina powder, 12 parts of methylcellulose, 2 parts of glycerin and 20 parts of water, by weight, was prepared as a ceramic material 80.

The size of the ceramic sheet to be molded was set to the width W (FIG. 2) of 250 mm and the thickness T (FIG. 1) of 200 μm. The mold 11 was formed into a shape corresponding to the size of the ceramic sheet 8. Thus, the outer diameter d (FIG. 2) of the extrusion screw 22 of the screw extruder 2 and the width W of the ceramic sheet 8 hold the relation $W \geq 3d$.

The first step for molding the ceramic sheet 8 is to load the ceramic material 80 of the aforementioned composition by way of a material supply portion 39. The ceramic material 80 thus loaded is conveyed into the extruder 3 at a lower position by a pair of push-in rollers 392. The ceramic material 80 in the extruder 3 advances while being kneaded by the extrusion screw 32 in rotation and pushed out into the vacuum chamber 4. The ceramic material 80 advanced into the vacuum chamber 4 is sent, in degassed state, to the extruder 2 at a lower position by a pair of push-in rollers 292. The ceramic material 80 in the extruder 2 advances while being further kneaded by the rotating extrusion screw 22, and after entering the mold 11, is molded and extruded from the gap between the bases 121, 122. The ceramic sheet 8 thus pushed out is dried by the dryer 7 and wound up in a coil.

According to this embodiment, in order to correct the shape of the ceramic sheet 8 extrusion molded, the ceramic material 80 passing through the mold 11 is extrusion molded while at the same time regulating the temperature of each of a plurality of portions of the ceramic material 80 corresponding to as many areas into which the mold 11 is transversely divided.

Specifically, before starting the molding process, the heating medium 6 having the temperature of 10° C. is circulated in all the chambers 51 uniformly by the heating medium circulation means 60. By observing the shape of the ceramic sheet 8 being molded, the temperature is decreased of the heating medium 6 circulated in the chamber 51 belonging to the area corresponding to a portion wrinkled, if any, under a high molding rate and/or the temperature is increased of the heating medium 6 circulated in the chamber 51 belonging to the other areas. As a result, the fluidity of the ceramic material 80 passing through the mold 11 is adjusted area by area, so that a substantially constant molding rate can be secured for transverse portions of the ceramic material 80 passing between the bases 121, 122.

Figure 5A:
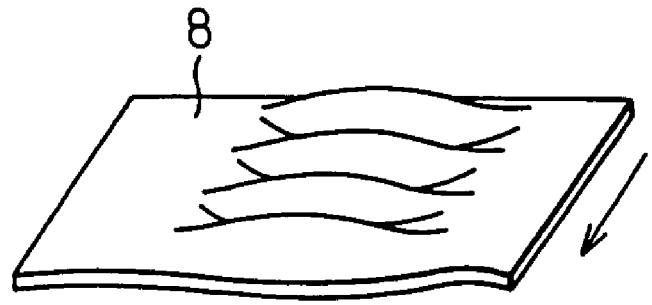
FIGS. 5(a), 5(b) and 5(c) are diagrams showing a ceramic sheet yet to be reshaped according to the first embodiment of the invention.

Further, an explanation will be given with reference to FIGS. 5(a) to 5(c). As shown in FIG. 5(a), assume that the central portion of the ceramic sheet 8 being extrusion molded is so high in molding rate that it is wrinkled. The temperature of the heating medium 6 circulated in the chambers 51 is changed in such a manner that the temperature of the portion of the ceramic material 80 corresponding to the central area of the mold through which it is passing is lower than the temperature of the portions of the ceramic material 80 corresponding to the transverse ends of the mold 11.

Figure 5B:
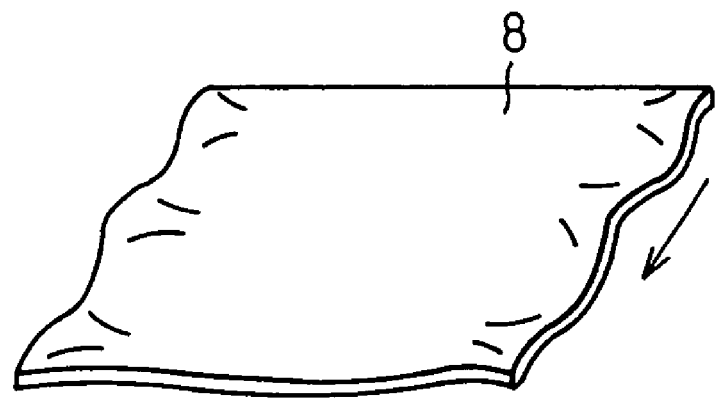
Figure 5C:
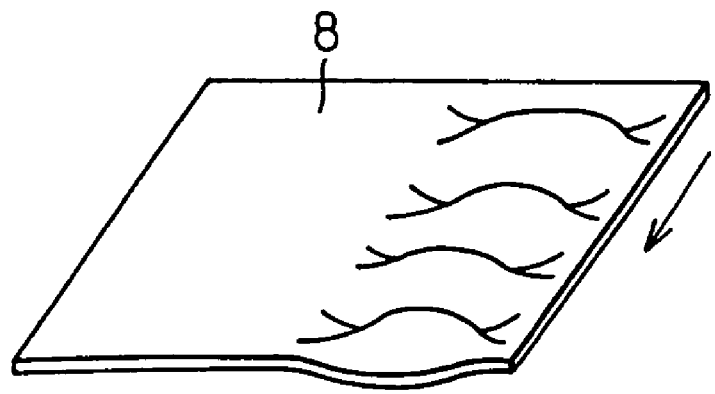
Figure 6:
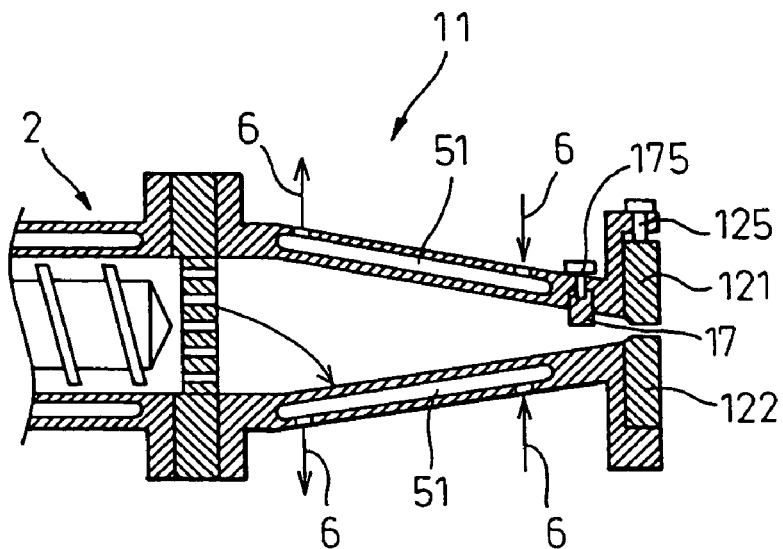
FIG. 6 is a diagram for explaining the configuration in the longitudinal section of a mold parallel to the direction of extrusion according to a second embodiment of the invention.

In the case where the transverse end portions of the ceramic sheet 8 being extrusion molded are so high in molding rate that they have developed wrinkles, as shown in FIG. 5(b), on the other hand, the temperature of the heating medium 6 circulated in each chamber 51 is changed in such a manner that the temperature of the transverse end portions of the ceramic material 80 corresponding to the side end areas of the mold 11 through which the ceramic material 80 is passing is reduced to a level lower than the temperature of the portion of the ceramic material 80 corresponding to the central area of the mold 11. Also, as shown in FIG. 5(c), in the case where the molding rate of a given part of the ceramic sheet 8 is so high as to develop a wrinkle there, the temperature of the heating medium 6 circulated in each chamber 51 is changed in such a manner that the temperature of the portion of the ceramic material 80 corresponding to the particular part of the ceramic sheet 8 passing through the mold 11 is reduced to a level lower than the temperature of the other parts of the ceramic material 80.

Unlike in this embodiment, the temperature of the heating medium 6 can of course be changed alternatively by changing the flow rate of the heating medium 6 and thus changing the amount of heat transmission, instead of by changing the temperature of the heating medium 6, or by a combination of the two methods.

As described above, the use of the molding apparatus 1 according to this embodiment facilitates the reshaping the ceramic sheet 8 into a superior one by operating the temperature regulation means 5 in accordance with the shape of the ceramic sheet 8 extruded from the mold 1.

By carrying out the molding method described by use of the molding apparatus according to this embodiment, therefore, even a comparatively wide, thin ceramic sheet can be extrusion molded in stable manner while preventing it from wrinkling.

In this embodiment, the outer diameter d of the screw is positively reduced to ϕ30 mm. As a result, the size of the screw extruder 2 as a whole can be reduced, and the disassembly work such as for changing the material can be performed by a single worker. In this way, the process is rationalized and the number of molding steps can be reduced.

Also, in view of the fact that the screw diameter d is reduced as described above, the internal volume of the screw extruder 2 is reduced. As a result, a smaller amount of air is introduced into the screw-type extruder 2, which in turn can reduce the amount of air mixed with the ceramic sheet 8 produced for an improved quality. By thus suppressing the intrusion of air, the chance of an insulation failure or cracking of the ceramic sheet 8 used as an electrically insulating material can also be reduced.

2nd Embodiment

Figure 7:
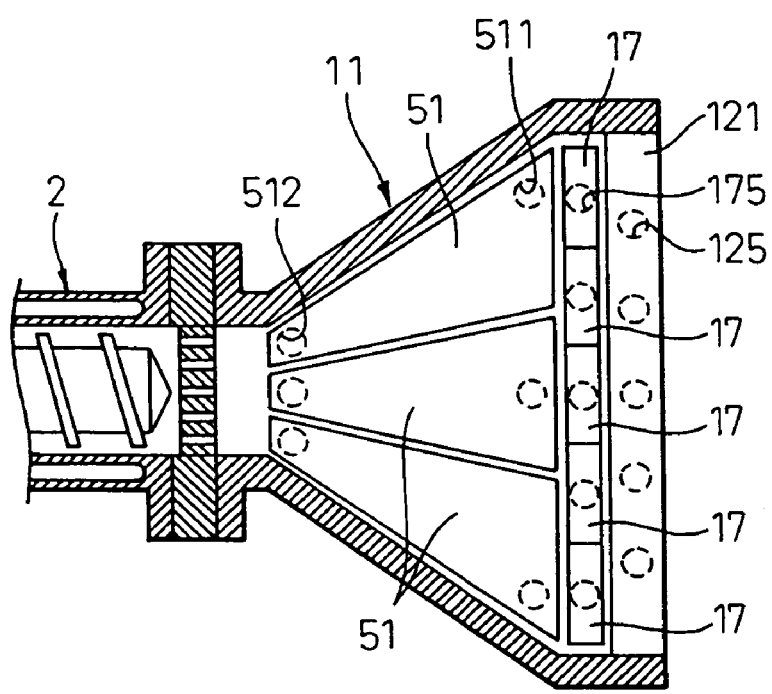
FIG. 7 is a diagram for explaining the configuration of the upper portion of the cross section of a mold according to the second embodiment of the invention.
Figure 8:
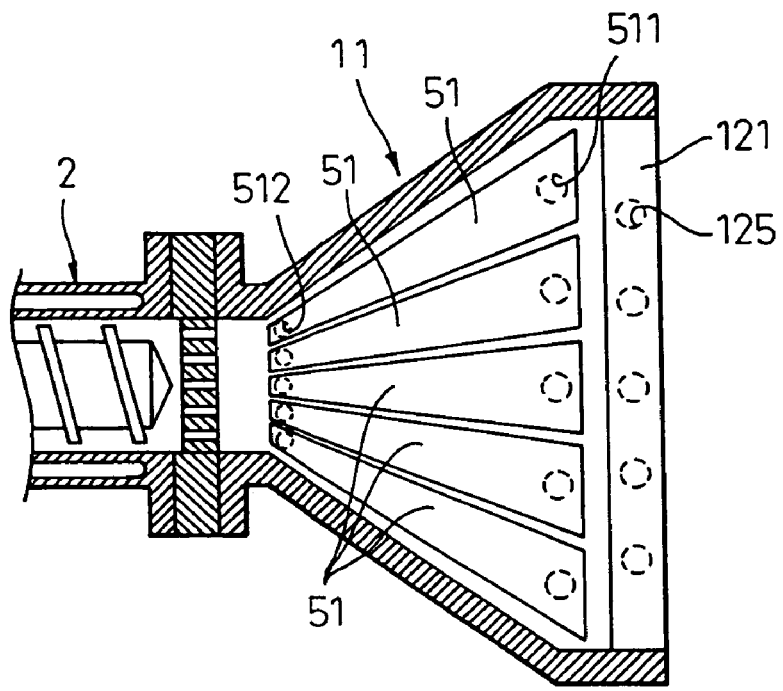
FIG. 8 is a diagram for explaining the configuration of the upper portion of the cross section of a mold according to a third embodiment of the invention.

This embodiment represents a case in which the rectification plate 17 for changing the flow resistance of the ceramic material 80 is arranged in a retractable manner in the mold 11 according to the first embodiment. specifically, as shown in FIG. 7, the rectification plate 17 is arranged inward of the base 121 and segmented into five transverse portions, each of which is adapted to extend or retract by adjusting the amount by which an extension/retraction screw 175 is forced in. The other points are similar to the corresponding points of the first embodiment.

In this embodiment, the physical flow resistance is controlled by extending/retracting the rectification plate 17 in addition to the temperature regulation of each area, thereby further improving the effect of correcting the shape such as by removing the wrinkles.

The other functions and effects are similar to those of the first embodiment.

Third Embodiment

This embodiment represents a case in which the areas of the mold 11 according to the first embodiment are changed. In other words, the mold 11 are divided into five transverse areas for both the upper and lower dies, and a chamber 51 is arranged in each area.

In this case, the number of divisions is greater than in the first embodiment, and therefore the temperature can be regulated in more detailed manner for further improving the effect of reshaping the ceramic sheet. In the case where a comparatively narrow ceramic sheet is molded, however, as many as five areas may not be required. In such a case, therefore, the same number of division areas can be employed as in the first embodiment to simplify the apparatus and reduce the equipment cost at the same time.

The other functions and effects of the present embodiment are similar to those of the first embodiment.

Fourth Embodiment

Figure 10A:
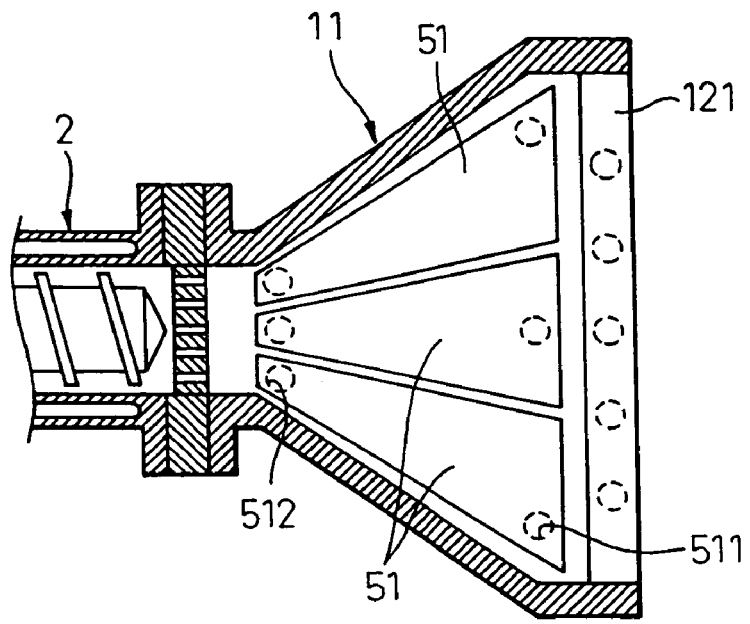
FIGS. 10(a) and 10(b) are diagrams for explaining the configuration of the upper and lower portions, respectively, of the cross section of a mold according to a fourth embodiment of the invention.
Figure 10B:
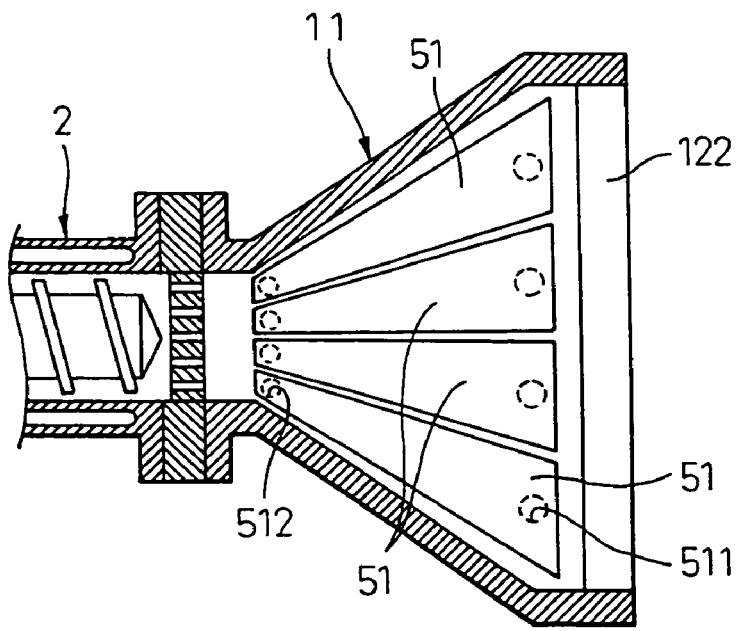
Figure 11:
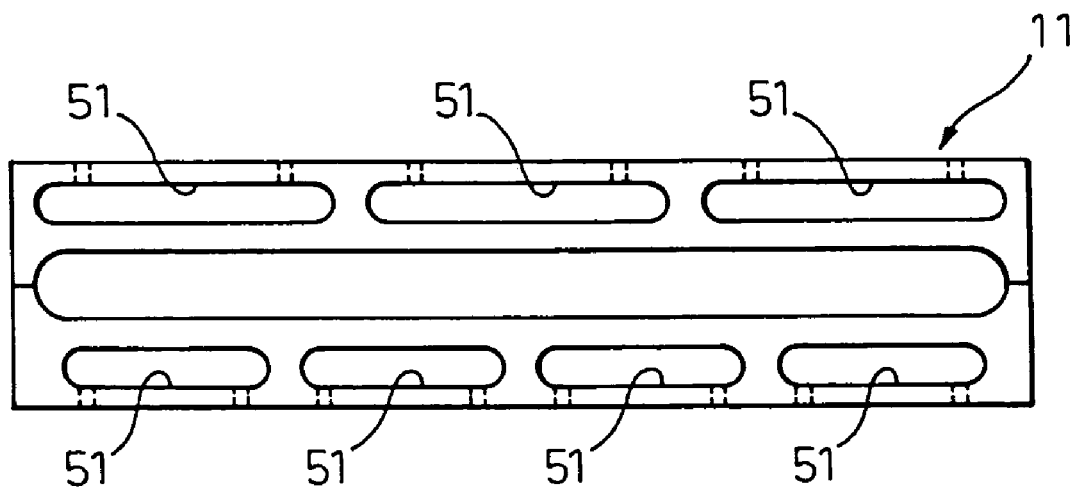
FIG. 11 is a diagram for explaining the configuration of the longitudinal section of a mold orthogonal to the direction of extrusion according to the fourth embodiment of the invention.

This embodiment, as shown in FIGS. 10a, 10b, represents a case in which the areas formed in the mold 11 according to the first embodiment are changed. Specifically, the upper die of the mold 11 is divided into three transverse areas (FIG. 10(a)) and the lower die is divided into four transverse areas (FIG. 10(b)), in each of which a chamber 51 is arranged. In this case, a larger transverse error which may occur in the lower surface than in the upper surface of the ceramic sheet 8 can be corrected by adjusting the temperature of the lower surface in more detailed manner than that of the upper surface.

The other functions and effects are similar to those of the first embodiment.

Fifth Embodiment

Figure 12:
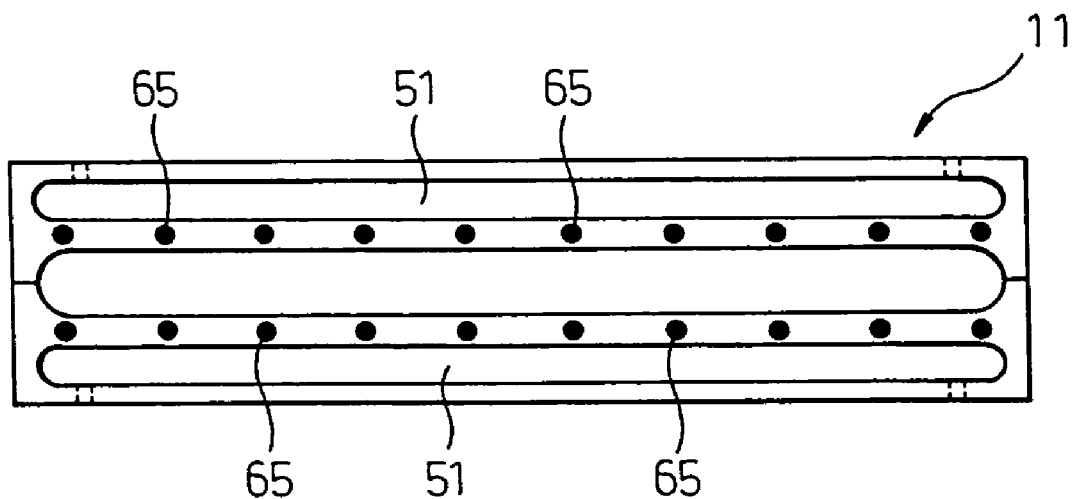
FIG. 12 is a diagram for explaining the configuration of the longitudinal section of a mold orthogonal to the direction of extrusion according to a fifth embodiment of the invention.

This embodiment represents a case, as shown in FIG. 12, in which a controllable heater 65 constituting a temperature regulation means 5 is arranged for each of the areas into which the mold is transversely divided, in addition to the heating medium circulation means 60. Specifically, a chamber 51 having only one undivided area is formed in each of the upper and lower dies of the mold 11, while a plurality of heaters 65 are embedded in the inner wall of each of the upper and lower dies.

In this case, the temperature of the whole ceramic material 80 passing through the mold 11 is controlled by the heating medium 6 circulated in the chambers 51, while at the same time operating a part of the heaters 65 thereby to regulate the temperature in a manner similar to the first embodiment. The number of transverse division areas can be easily increased by changing the intervals between the heaters 65, thereby making possible an even more detailed temperature adjustment. The other functions and effects of this embodiment are similar to those of the first embodiment.

Sixth Embodiment

In this embodiment, based on the molding apparatus according to the first and third embodiments, ceramic sheets 8 of various sizes were molded to test the effect of the temperature regulation means 5.

Figure 9:
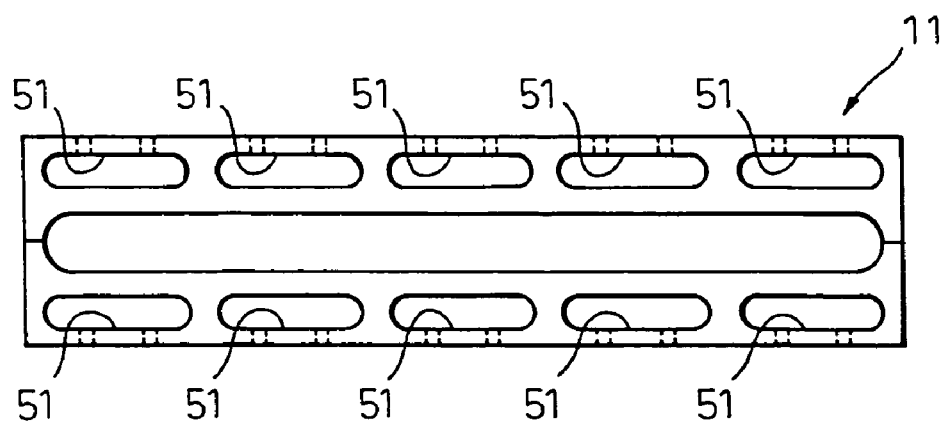
FIG. 9 is a diagram for explaining the configuration of the longitudinal section of a mold orthogonal to the direction of extrusion according to the third embodiment of the invention.

The test was conducted, as shown in Table 1, using two types of screw-type extruders 2, 3 having screw diameters of $\phi 30$ mm and $\phi 50$ mm, respectively. The width of the ceramic sheet is set at 30 to 250 mm, and the thickness thereof at 200 μm for all the cases. Table 1 also shows the number of transverse division areas (control zones) of the mold used for the test, the value of W/d and the presence or absence of a wrinkle after molding. The upper and lower dies are both divided into the same number of areas, i.e. three or five areas, as shown in FIGS. 3 and 9.

Assume that the temperature regulation means is not used for temperature regulation. As understood from Table 1, no problem is posed for a W/d of not more than 2. For a value W/d of 3, however, wrinkles occur sometimes. For a W/d of more than 3, wrinkles always occur. In the case where the temperature is regulated by the temperature regulation means, in contrast, the wrinkle can be sufficiently suppressed and a ceramic sheet of superior shape can be molded up to a W/d value of 6 (i.e. even when a $W \geq 5d$) even for three division areas. Further, it is seen that for a W/d of 8.3, a small number of wrinkles occur for three division areas, while division into five areas can obviate the wrinkling.

TABLE 1

| Screw dia. d (mm) | Sheet width W (mm) | W/d | Temp. regulated or not (number of control zones) | Wrinkled or not |
|---|---|---|---|---|
| φ30 | 30 | 1 | not regulated | ○ |
|  | 60 | 2 | not regulated | ○ |
|  | 90 | 3 | not regulated | Δ |
|  | 90 | ↑ | regulated (3 zones) | ○ |
|  | 110 | 3.6 | not regulated | X |
|  | 110 | ↑ | regulated (3 zones) | ○ |
|  | 120 | 4 | not regulated | X |
|  | 120 | ↑ | regulated (3 zones) | ○ |
|  | 150 | 5 | not regulated | X |
|  | 150 | ↑ | regulated (3 zones) | ○ |
|  | 180 | 6 | not regulated | X |
|  | 180 | ↑ | regulated (3 zones) | ○ |
|  | 180 | ↑ | regulated (5 zones) | ○ |
|  | 250 | 8.3 | regulated (3 zones) | Δ |
|  | 250 | ↑ | regulated (5 zones) | ○ |
| φ50 | 60 | 1.1 | not regulated | ○ |
|  | 150 | 2.7 | not regulated | ○ |
|  | 180 | 3.3 | not regulated | X |
|  | 180 | ↑ | regulated (3 zones) | ○ |

○: Satisfactory,
Δ: Wrinkles sometimes,
X: Wrinkles

Seventh Embodiment

Figure 13:
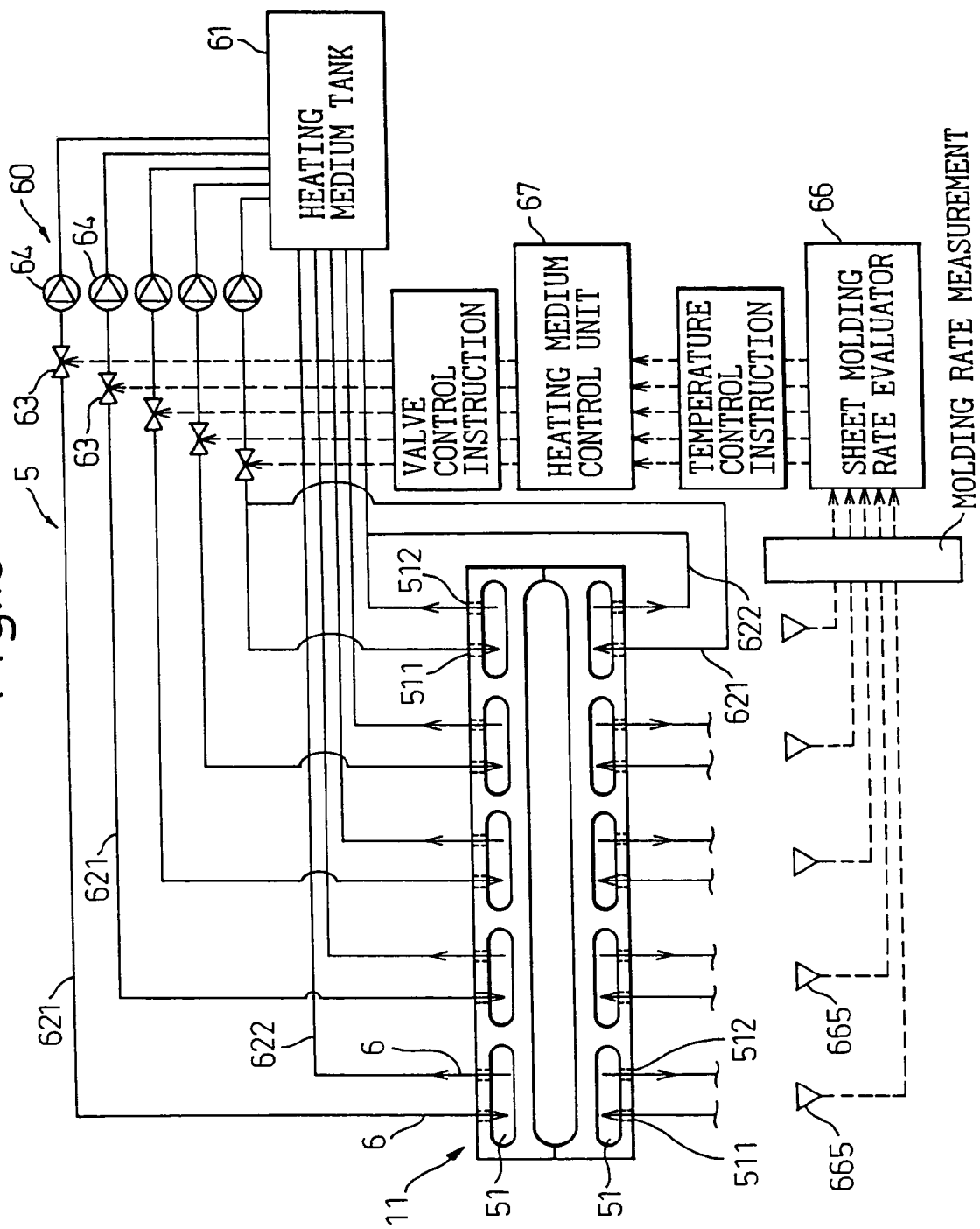
FIG. 13 is a diagram for explaining the configuration of the temperature regulation means according to a seventh embodiment of the invention.

This embodiment represents a case in which the temperature regulation means 5 of the molding apparatus 1, as shown in FIG. 13, according to the first embodiment is automatically controlled.

As shown in FIG. 13, the temperature regulation means 5 according to this embodiment includes chambers 51 arranged in each of five transverse areas into which the mold 11 is divided and a heating medium circulation means 60 for circulating the heating medium 6 arranged in each of the chambers 51 for cooling the ceramic material.

The heating medium circulation means 60 according to this embodiment is so configured as to be controlled by feed back in accordance with the molding rate of each transverse portion of the ceramic sheet 8.

Specifically, first, circulation pipes 621, 622 from a heating medium tank 61 are connected to an inlet 511 and an outlet 512, respectively, of each chamber 51 of the mold 11. The circulation pipe 621 connected to the inlet 511 has arranged thereon a flow rate control valve 63 and a pump 64 for controlling the flow rate of the heating medium circulated in each of the circulation pipes 621. According to this embodiment, the circulation pipes 621, 622 constitute the same route and branch to the opposed areas in the upper and lower dies.

The flow rate control valve 63 is connected to the heating medium control unit 67, and the valve opening degree is regulated by a valve control instruction from the heating medium control unit 67 thereby to adjust the flow rate of the heating medium 6.

Further, the heating medium control unit 67 is connected to a sheet molding rate evaluation unit 66, and is configured to calculate the valve control instruction based on a temperature control instruction issued from the sheet molding rate evaluation unit 66.

The sheet molding rate evaluation unit 66, as shown in FIG. 13, is connected to five molding rate sensors 665 arranged under the exit side of the mold 11 and is configured to calculate the temperature control instruction based on a molding rate measurement acquired from the molding rate sensors 665. The five molding rate sensors 665 correspond to the respective transverse division areas for temperature regulation.

The aforementioned configuration of this embodiment makes it possible to automatically control the temperature regulation means.

Specifically, before the molding process for the ceramic sheet 8 is started, the heating medium 6 is circulated in each chamber 51 under specified initial conditions. The speed of the ceramic sheet 8 molded in the mold 11 is measured by the five molding rate sensors 665.

Based on the molding rate measurements, the sheet molding rate evaluation unit 66 determines which division area should be increased or decreased in temperature, and sends the result to the heating medium control unit 65 as a temperature control instruction. In response to the temperature control instruction, the heating medium control unit 67 determines the flow rate of the heating medium 6 circulated in each chamber 51 thereby to control the flow rate control valve 63.

As described above, the use of the molding apparatus and the molding method according to this embodiment permits the temperature regulation means 5 to be controlled automatically, by feed back, in accordance with the shape of the ceramic sheet 6 while being molded. Thus, the responsiveness and accuracy of the control operation can both be improved.

The other functions and effects are similar to those of the first embodiment.

Eighth Embodiment

This embodiment represents a case in which the outer diameter d of the extrusion screws 22, 23 of the screw-type extruders 2, 3 according to the first embodiment is changed and the resulting number of internal defects of the ceramic sheet 8 produced is measured. The internal defects are caused by the air involved at the time of extrusion molding. The number of large defects is visually measured through the sheet using a projector, while a small defect is measured by the transmission inspection using an x-ray micro focus.

Figure 14:
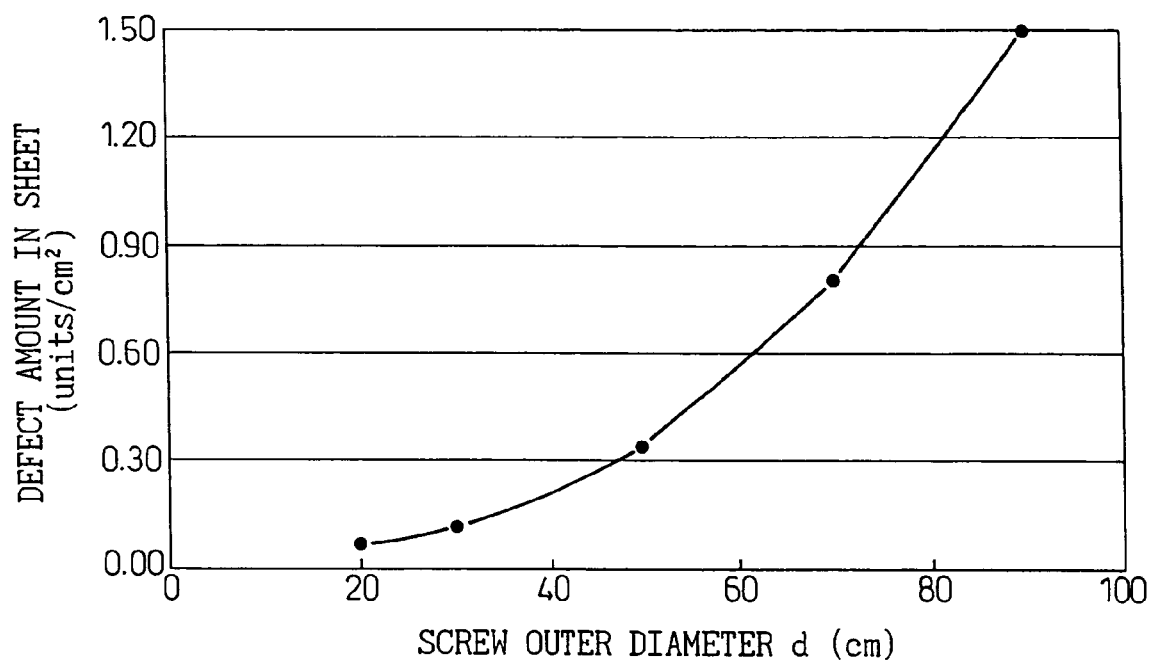
FIG. 14 is a diagram for explaining the relation between the outer diameter of the screw and the number of internal defects according to an eighth embodiment of the invention.

The measurements are shown in FIG. 14, in which the abscissa represents the outer diameter d of the extrusion screw and the ordinate the number of internal defects of the ceramic sheet 8.

As understood from FIG. 14, the number of internal defects is proportional to the outer diameter d. This indicates that the larger the outer diameter d, the more likely is air to be involved at the time of extrusion molding, which air remains as internal defects. Also, it is seen that the number of internal defects is satisfactory and not more than one per unit area (1 $cm^2$) for the outer diameter d of not more than 70 mm.

As described above, according to this embodiment, it has been found that a ceramic sheet having fewer internal defects can be produced in proportion to the decrease in the outer diameter d of the screw. Utilizing this fact, a ceramic sheet used as an electrically insulating material, for example, is produced by an extrusion molding apparatus having the outer diameter of the screw as small as possible. In this way, a ceramic sheet can be produced in which the internal defects are fewer and insulation failure or cracking substantially does not occur.

In each of the embodiments described above, the ceramic sheet of any of various materials or for any of various applications can be produced. Examples of ceramic sheets that can be produced according to the present invention include those used for a stack-type piezoelectric device used for an injector or other actuators, a ceramic sheet for the ceramic laminate of a stack-type capacitor, or other ceramic sheets each used as a single layer. Specific materials usable are PZT (lead titanite zirconate), barium titanite, zirconium oxide, etc.

What is claimed is:

1. An apparatus for molding a ceramic sheet, comprising a pair of screw type extruders and a mold arranged at the forward end of one of said extruders for extrusion molding a ceramic material introduced into the extruders to form a ceramic sheet, wherein the mold is divided along the width of the ceramic sheet to be formed into a plurality of transverse areas, each extending in the direction of ceramic material flow, and includes means for regulating the temperature of each of said plurality of transverse areas to thereby regulate the temperature of the portions of the ceramic sheet respectively corresponding to the transverse areas into which the mold is divided, and wherein the outer diameter d of the screw built in each of the extruders and the width W of the ceramic sheet hold the relation $W \geq 3d$.

2. An apparatus for molding a ceramic sheet according to claim 1, wherein the temperature regulation means includes a plurality of chambers, one associated with each of the areas into which the mold is transversely divided, and a heating medium circulation means included in each said chamber for circulating a heating medium to heat or cool the material.

3. An apparatus for molding a ceramic sheet according to claim 1, wherein the temperature regulation means can include a heater controllable for each of the areas into which the mold is divided transversely.

4. An apparatus for molding a ceramic sheet according to claim 1, comprising a molding rate detecting means for detecting, for each corresponding area, the molding rate of the ceramic sheet extruded from the mold, and control means for controlling conveying of the ceramic sheet based on the molding rate acquired from the molding rate detecting means.

5. An apparatus for molding a ceramic sheet according to claim 1, wherein the outer diameter d of the screw built in the extruders and the width W of the mold outlet opening hold the relation $W \geqq 5d$.

6. An apparatus for molding a ceramic sheet according to claim 1, wherein the outer diameter d of the screw built in the extruders is not more than 70 mm.

7. An apparatus for molding a ceramic sheet according to claim 1, wherein the thickness of the mold outlet opening is not more than 1.5 mm.

8. An apparatus for molding a ceramic sheet according to claim 1, wherein the thickness of the mold outlet opening is not more than 300 μm.

9. An apparatus for molding a ceramic sheet according to claim 1, wherein said mold includes a rectification plate arranged in retractable manner for changing the flow resistance of the ceramic material.

* * * * *